A. C. GILBERT.
ELECTRIC SWITCH.
APPLICATION FILED JAN. 28, 1918.
1,307,094.
Patented June 17, 1919.
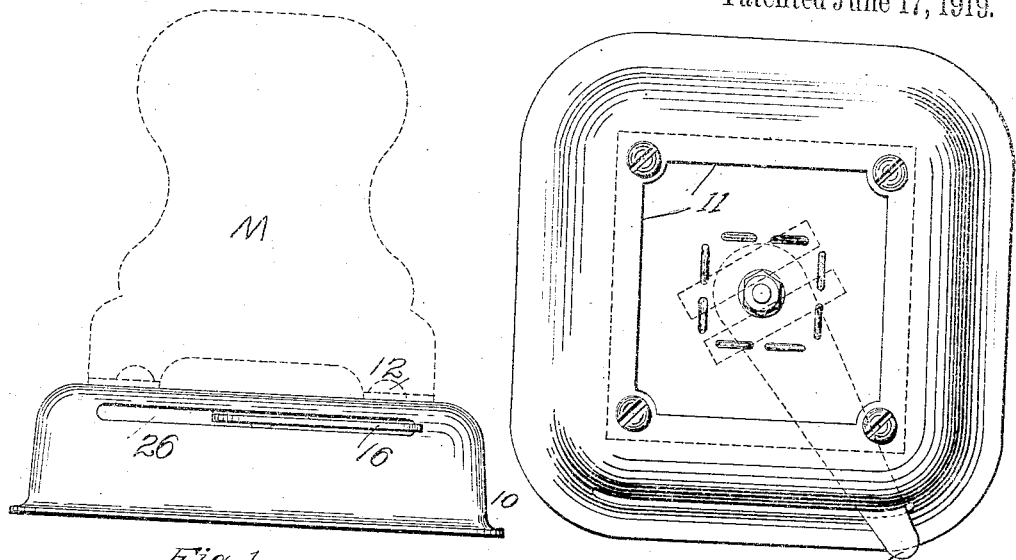
Fig 1.
Fig 3.
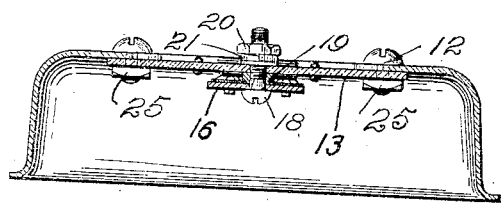
Fig 2.
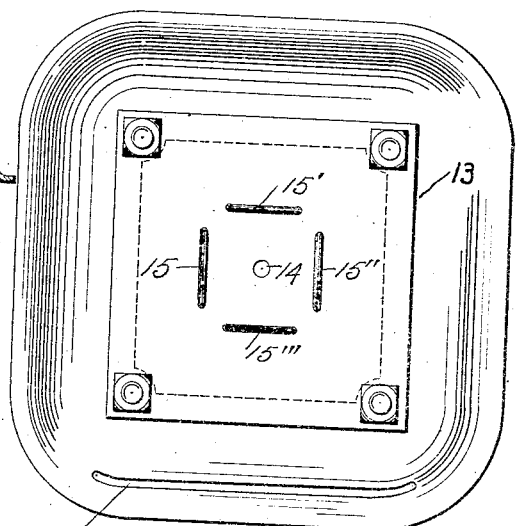
Fig 4.
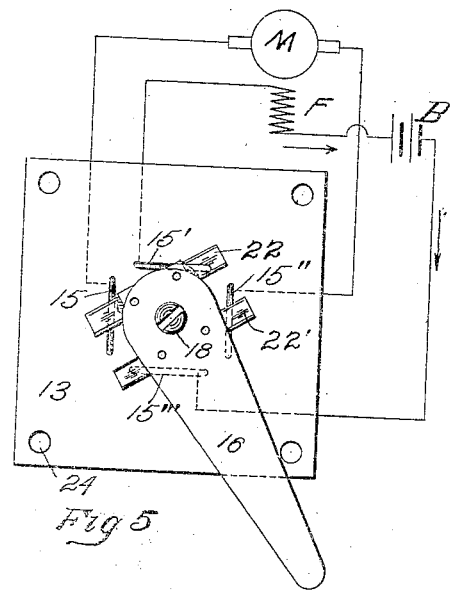
Fig 5.
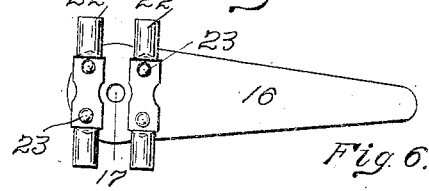
Fig 6.
Inventor.
Alfred C. Gilbert
By Harry E. Rockwell
Attorney.

UNITED STATES PATENT OFFICE.

ALFRED C. GILBERT, OF NEW HAVEN, CONNECTICUT, ASSIGNOR TO THE A. C. GILBERT COMPANY, OF NEW HAVEN, CONNECTICUT, A CORPORATION OF CONNECTICUT.

ELECTRIC SWITCH.

1,307,094.  Specification of Letters Patent.  Patented June 17, 1919.

Application filed January 28, 1918. Serial No. 214,139.

*To all whom it may concern:*

Be it known that I, ALFRED C. GILBERT, a citizen of the United States, residing in the city and county of New Haven and State of Connecticut, have invented certain new and useful Improvements in Electric Switches, of which the following is a full, clear, and exact description.

This invention relates to electric switches, and more particularly to switches or like current controlling devices used in connection with toy motors.

One of the primary objects of the invention is to furnish a switch or like device of very simple and cheap construction, which is particularly adapted for reversing or controlling the supply of current to toy electric motors and other small electric apparatus.

Another object of the invention is to provide a switch having a casing which is adapted to act as a motor base if desired, provision being made for readily securing the switch to the base and removing it therefrom.

Another object of the invention is to provide an electric switch of the type indicated, which is very simple in construction, and consists of a minimum number of parts, which can be very readily assembled and taken apart.

Still another object of the invention is to furnish a cheap but efficient reversing switch, whereby the direction of the current supplied to the motor or like apparatus may be reversed.

To these and other ends, the invention consists of the novel features and combinations of parts to be hereinafter described and claimed.

In the accompanying drawings,

Figure 1 is a side elevation of a casing having my improved switch mounted therein, and an electric motor, indicated in dotted lines, mounted upon the casing;

Fig. 2 is a vertical sectional view through the casing and reversing switch shown in Fig. 1;

Fig. 3 is a plan view of the casing, showing the switch mounted therein, in dotted lines;

Fig. 4 is a bottom view of the casing shown in Fig. 3, the pivoted member of the switch being removed.

Fig. 5 is a plan view of my complete reversing switch removed from its casing, the electrical connections controlled by the switch being shown diagrammatically; and Fig. 6 is a detail view of the pivoted member of the reversing switch.

In the drawings I have designated the hollow casing by the numeral 10, in which my reversing switch is mounted. This casing is preferably stamped out of sheet metal and is given the form of an inverted bowl or deep saucer in cross-section. The upper face of the casing is preferably provided with a flat serface having an enlarged opening formed therein, which opening is bound by the four walls or edges 11. The casing 10 is designed to serve also as the base for a toy motor M, which motor may be mounted upon the upper face of the casing, as indicated in dotted lines in Fig. 1, the motor preferably being provided with feet having drill holes therein, by means of which it may be secured to the casing 10 by bolts or screws, such as 12.

My reversing switch preferably includes a plate of insulating material 13 having formed centrally thereof a drill hole 14. Upon one face of the plate 13 are mounted four electric conductors, 15, 15′, 15″, 15‴ (see particularly Fig. 5), these conductors preferably being arranged substantially symmetrically about the drill hole 14, and preferably in the position of the four sides of a quadrangle. Each of the conductors 15, 15′, 15″ and 15‴ is preferably formed of a long narrow piece of metal, such as wire, and each of the conductors 15, 15′, 15″ and 15‴ is insulated from the other conductors. A convenient way of mounting the conductors upon the plate 13 is to form a drill hole in the plate 13 at each end of the position that the conductors are to assume, and then pass the opposite ends of a relatively short piece of wire through the drill holes just referred to, formed in the plate 13, and clench the ends of the wire upon the opposite face of the plate. This provides a very simple and very satisfactory means of securing the conductors to the plate of insulating material. The current which is to be controlled by my reversing switch may conveniently be supplied to the same by connecting the current supply wires to one end of each of the conductors 15, 15′, 15″, 15‴ which project through the insulated plate 13, by means of solder or similar securing means.

The pivoted member of my reversing switch consists of a piece of insulating material 16 having a drill hole 17 formed therein, by which the member 16 may be pivotally mounted upon the plate 13 by means of a bolt or screw 18. A washer 19 is preferably mounted upon the bolt 18 between the plate 13 and the pivoted lever member 16 to space the two elements apart, and to form a bearing surface upon which the member 16 turns. When the member 16 is pivotally mounted upon the plate 13 by the bolt 18, the bolt may be secured in place by means of a nut 20 on the threaded end thereof, a spring washer 21 preferably being provided between the inner face of the nut and the outer face of the plate 13. This spring washer 21 will clamp the pivoted member 16 in place upon the plate 13 with sufficient friction to prevent the same from being accidentally swung about its pivot. Mounted upon one face of the member 16 are a pair of contact members 22, 22′. These contact members are secured to the member 16 upon opposite sides of the drill hole 17 by rivets, or similar securing means, 23 (see particularly Fig. 6). The outer ends of the contact members 22, 22′ are preferably made curved or V-shaped in cross-section, the arrangement being such that the apex of the V-shaped portion of the contact member will contact with the conductors 15, 15′, 15″, 15‴. The object in so constructing the members 22, 22′ is to reduce the width of the portions of the contacts 22, 22′ which engage the conductors.

The reversing switch just described is preferably mounted inside of the casing 10 by providing drill holes 24 in the four corners of the plate 13, these drill holes being positioned to receive the projecting ends of the bolts 12 above mentioned. When the plate 13 has been positioned inside of the casing 10 and the projecting ends of the bolts 12 have been inserted through the drill holes 24, the plate may be securely fastened in place by nuts 25 threaded upon the outer ends of screws 12 (see particularly Fig. 2). The object in providing the opening in the top of the casing, which opening is defined by the walls or edges 11, is to permit access to the upper face of the plate 13 upon which the ends of the conductors are clenched. By providing free access to the upper face of the plate 13 the current supply wires which furnish the current to be controlled by the switch may be readily secured to the protruding ends of the conductor 15, 15′, 15″, 15‴ by solder or other convenient means. This arrangement provides a very convenient means of connecting the wires which supply the current to the toy motor M to the switch mounted in the base or casing 10. The casing 10 is preferably provided with a longitudinal slot 26 formed in one wall thereof adjacent the upper face of the casing, this slot being so positioned that when the reversing switch is mounted within the casing 10, the outer end of the pivoted lever 16 projects through this opening so that the end of the member 16 may be easily grasped by the fingers in order to operate the switch. The ends of the slot 26 provide convenient means for limiting the arc through which the pivoted member 16 may be swung.

Referring particularly to Fig. 5, and assuming that the current supplied by the battery B is flowing in the direction indicated by the arrow, it will be seen that the current passes from the battery B to the conductor 15‴, and from this conductor through the contact 22′ to the conductor 15″, and from there through the armature of the motor M to the conductor 15, from this conductor through the contact 22 to the conductor 15′, and then through the field F back to the battery B, the arrangement being such that the armature will rotate in one direction. Should it be desired to reverse the direction of rotation of the motor armature, the switch controlling lever 16 is swung from the position shown in Fig. 5 to the opposite end of the slot 26. The contacts 22, 22′ will thus be moved into engagement with opposite conductors. The path of the current will then be as follows: from the battery B, in the direction of the arrow, to the conductor 15‴, from this conductor through the contact 22′ to the conductor 15, and from this conductor through the armature in a direction opposite to the direction in which the current passed before the switch lever was shifted; from the armature to the conductor 15″, and from this conductor through the contact 22 to the conductor 15′; thence through the field in the same direction in which it passed before the switch was shifted, thus reversing the direction of rotation of the motor, it being recalled that in order to reverse the direction of rotation of the ordinary series motor it is necessary to reverse the direction of the current either through the armature or the field, but not through both. Should it be desired to cut off the current from the battery B to the motor, the switch lever 16 is shifted to its intermediate position midway between the ends of the slot 26. This will move both the contacts 22, 22′ into engagement with the conductors 15 and 15″, thus breaking the electrical connection between the conductors 15 and 15‴ and the other two conductors, so that the battery circuit is broken, and there will be no danger of running the battery down.

From the above description, it will be seen that I have devised an extremely simple and efficient reversing switch which is so constructed that any one of the conductors may be electrically connected to any one of the remaining conductors without completing the circuit through the other two conductors.

From the above description, it will be seen that the simple reversing switch that I have devised serves not only as means for reversing the direction in which the toy motor will run, but also serves as means for connecting or disconnecting the current supplied to the motor.

Various changes in the details of the construction may be adopted without departing from the scope of the invention as defined in the claims.

What I claim is:—

1. A reversing switch comprising a plate of insulating material having spaced conductors secured to one face thereof and positioned to form the four sides of a quadrangle, said conductors comprising metal strips having the ends thereof extending through said plate and bent into clamping engagement therewith, and means pivoted upon said plate to coöperate with said conductors.

2. A reversing switch comprising a plate of insulating material having four separate conductors secured to one face thereof, said conductors comprising flexible metal strips having the ends thereof bent into clamping engagement with said plate and positioned to form the four sides of a quadrangle, and contact means coöperating with said conductors.

3. In a reversing switch, a plate of insulating material, two pairs of conductors secured to one face of said plate, and a pair of spaced contact members coöperating with said conductors, whereby any one of said conductors may be electrically connected with any one of the other three conductors while it remains insulated from the remaining two conductors.

4. A reversing switch comprising two pairs of spaced conductors insulated from one another, contact means pivotally mounted to coöperate therewith, said contact means being positioned to complete the circuit between any one of said conductors and any one of the three remaining conductors while the first mentioned conductor remains insulated from the remaining two conductors.

5. A reversing switch, comprising a plate of insulating material having spaced conductors secured thereto and positioned to form the four sides of a quadrangle, and a pair of parallel spaced contact members pivotally mounted upon said plate, said contact members constructed to overlie and to electrically connect either the adjacent or the opposite spaced conductors.

6. A reversing switch comprising two pairs of spaced conductors each insulated from the other conductors, contact means pivotally mounted to coöperate with said conductors, a lever for operating said contact means, said contact means being constructed to complete the circuit between any one of said conductors and any one of the remaining three conductors while the two conductors electrically connected are insulated from the remaining two conductors.

7. In an electric switch, a plate of insulating material, a switch mounted on said insulating plate, comprising four separate conductors spaced in the position of the four sides of a quadrangle and contact means coöperating with said conductors, and a hollow casing member open at the top, said insulating plate detachably secured in the top part of said casing and positioned to form a closure for the opening in the top of said casing, whereby said conductors are readily accessible from the upper face of said casing.

8. In combination with a hollow base member for an electric motor, an electric switch mounted within said base member, comprising a plate of insulating material detachably secured in the top portion of said base member, spaced conductors secured to said insulating plate, and contact means coöperating with said conductors, said base member having an opening formed in its upper face and said insulating plate positioned to form a closure for said opening, whereby said conductors are readily accessible from the upper face of said base member.

9. A reversing switch comprising a plate of insulating material having spaced conductors secured to one face thereof, said conductors comprising flexible metal strips having the ends thereof extending through said plate and bent into clamping engagement therewith, and a coöperating member pivotally mounted upon said plate, said member having spaced substantially parallel contact members secured thereto, each contact member having its ends bent transversely to form a reduced contact surface.

In witness whereof I have hereunto set my hand on the 21st day of January, 1918.

ALFRED C. GILBERT.